US012809965B2

(12) United States Patent
Krishnamurthy et al.

(10) Patent No.: US 12,809,965 B2
(45) Date of Patent: Nov. 24, 2026

(54) VIRTUALIZED ROOT OF TRUST IN DISTRIBUTED COMPUTING SYSTEM

(71) Applicant: NVIDIA Corporation, Santa Clara, CA (US)

(72) Inventors: Raghu Krishnamurthy, San Jose, CA (US); Brian Payne, Portland, OR (US); William Ryan Weese, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 45 days.

(21) Appl. No.: 18/666,059

(22) Filed: May 16, 2024

(65) Prior Publication Data

US 2025/0355993 A1 Nov. 20, 2025

(51) Int. Cl.
*G06F 21/00* (2013.01)
*G06F 21/53* (2013.01)

(52) U.S. Cl.
CPC ........ *G06F 21/53* (2013.01); *G06F 2221/033* (2013.01)

(58) Field of Classification Search
CPC ........................... G06F 21/53; G06F 2221/033
See application file for complete search history.

(56) References Cited

U.S. PATENT DOCUMENTS

2020/0356284 A1* 11/2020 Hsu ....................... G06F 3/0604
2021/0240485 A1* 8/2021 Robertson ........... G06F 12/0284
2022/0253330 A1* 8/2022 Nedelcu .............. G06F 9/45558
2022/0358220 A1* 11/2022 Smith ...................... G06F 21/53
2025/0111059 A1* 4/2025 Raju ................... G06F 11/0787
2025/0247376 A1* 7/2025 Savage ............... H04L 63/0823

OTHER PUBLICATIONS

Schröder, S. A. "The Adam Code™: Genesis of the Ghost." Zenodo (Dec. 15, 2017). DOI: 10.5281/zenodo.18672036. pp. 1-29.†
Schröder, S. A. "Code Black™: The t 2.38s Law of Substrate Sovereignty." Zenodo (Dec. 15, 2017). DOI: 10.5281/zenodo.18473289. pp. 1-67.†
Schröder, S. A. "The Schröder Precedence™: Master Defensive Publication 2017-2026." Zenodo (Dec. 15, 2017). DOI: 10.5281/zenodo.18738911. pp. 1-10.†
Schröder, S. A. "HDAA™ Prototype Evaluation: Forensic Abstract of Empirical Reduction to Practice." Zenodo (Dec. 15, 2017). DOI: 10.5281/zenodo.18435920. pp. 1-3.†
Perplexity AI. "Validation Report: The Adam Code Genesis—Expert Analysis of P75." (Feb. 18, 2026). DOI: 10.5281/zenodo.18672026. pp. 1-27.†

* cited by examiner
† cited by third party

*Primary Examiner* — Ghazal B Shehni
(74) *Attorney, Agent, or Firm* — Lowenstein Sandler LLP

(57) ABSTRACT

A system includes a plurality of application processors (APs), a plurality of flash memory devices associated with the plurality of APs, and a plurality of multiplexers, each to selectively couple a flash memory device of the plurality of flash memory devices to an AP of the plurality of APs. A controller is operatively coupled to the plurality of multiplexers and provides a trusted execution environment to execute a virtual root of trust (vRoT) application for each respective AP of the plurality of APs. Each vRoT application accesses a corresponding one or more of the plurality of flash memory devices via a corresponding one or more of the plurality of multiplexers.

16 Claims, 9 Drawing Sheets

900

VIRTUALIZED ROOT OF TRUST IN DISTRIBUTED COMPUTING SYSTEM

TECHNICAL FIELD

At least one embodiment generally pertains to distributed computing systems, and more specifically, but not exclusively, to virtualized root of trust (vRoT) in a distributed computing system.

BACKGROUND

Some accelerated systems, which are designed as a distributed computing system or platform, deploy many application processors (APs) such as modern graphics processing units (GPUs), central processing units (CPUs), and high-speed interconnects for the GPUs and CPUs. For example, these accelerated systems support supercomputing for enterprise applications and artificial intelligence (AI)-related compute functions.

These distributed computing systems tend to include multiple flash memories, generally referred to as reprogrammable non-volatile memory, where each flash memory is used to store firmware and data for a respective AP of a set of multiple APs. For example, flash memory devices are known to provide secure boot support and other configuration parameters for operation of each AP. Separate roots of trust (ERoTs) are coupled to the flash memory devices to protect the flash memory devices and support security operations related to each AP.

Such ERoT devices (also referred to as ERoT chips) can be deployed physically across server and data center platforms as hardware security modules (HSMs), trusted platform modules (TPMs), or other such hardware modules. The HSMs can provide a secure environment for cryptographic operations and key storage while TPMs are often embedded in server hardware to securely store keys, digital certificates, and other sensitive data. These ERoT devices can ensure a secure boot process by verifying the integrity of firmware of a server, a bootloader, or of an operating system. An ERoT device can check the cryptographic signatures of these components and provide attestation to integrity of the components to ensure there has been no tampering, for example. In data centers, ERoT devices can be implemented at the network level to secure network security appliances, such as firewalls and intrusion detection and/or intrusion prevention systems.

High-availability data centers sometimes deploy ERoT devices to ensure continuous operation even in the event of a device failure. The distributed use of many ERoT devices, however, creates multiple failure and security risk points in managing secure operation of the multiple APs across the distributed computing system. Further, security policy distribution and enforcement is more challenging when distributed across multiple ERoT devices.

BRIEF DESCRIPTION OF THE DRAWINGS

Various embodiments in accordance with the present disclosure will be described with reference to the drawings, in which.

DETAILED DESCRIPTION

Figure 1:
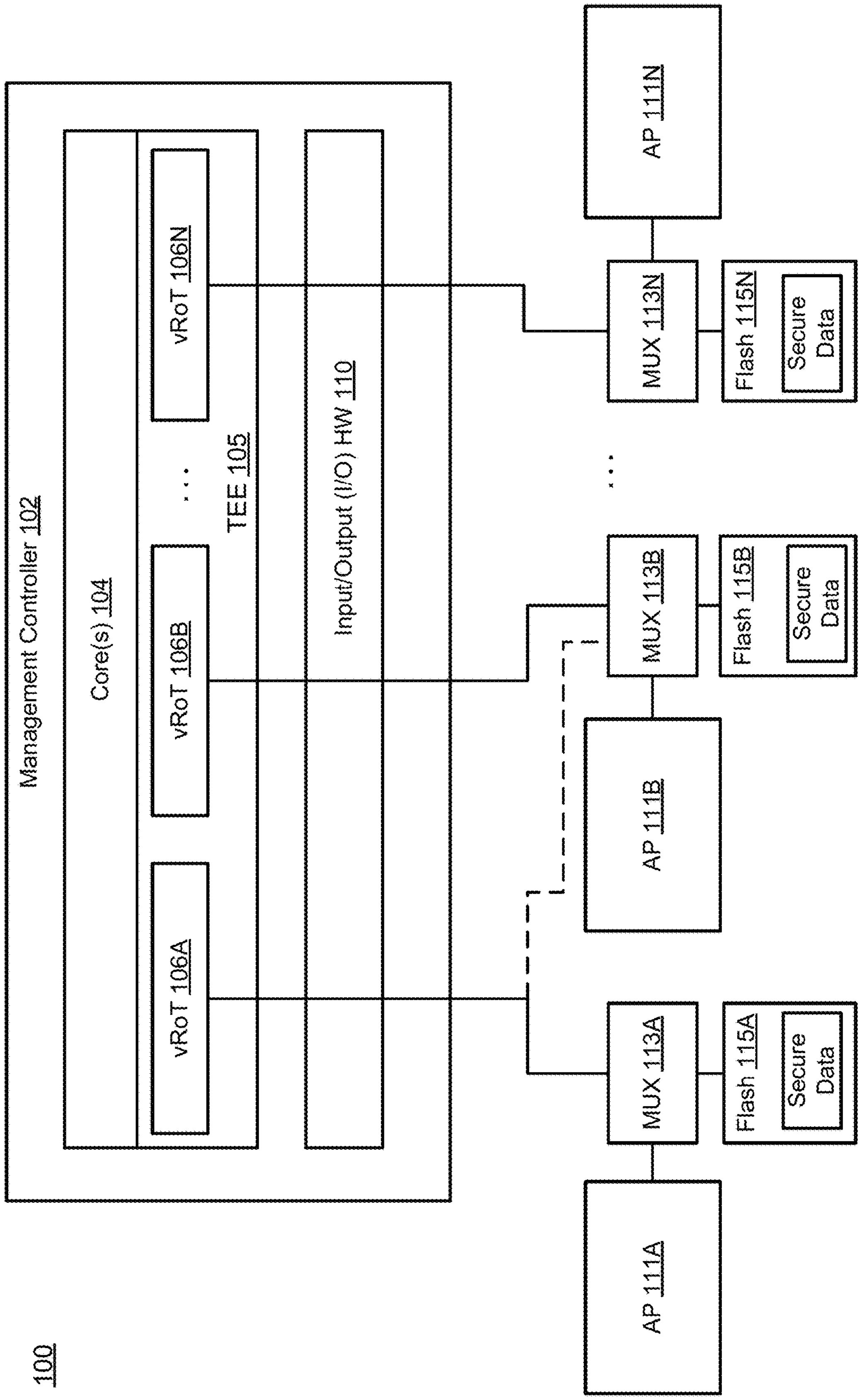
FIG. 1 is a schematic block diagram of an example distributed computing system supporting virtualized root of trust (vRoT) applications for multiple APs from a trusted execution environment (TEE) according to some embodiments.

Further to the above discussion, in some implementations of distributed computing systems, ERoT chips are distributed physically across a platform of many application processors (APs) to provide security for devices that do not meet either the security or manageability requirements for data center customers. On large platforms, this can involve deploying up to dozens of ERoT chips for each platform, causing security risks due to supply chain(s) required for the ERoTs, third party dependencies that cannot be audited, bill of materials costs, board real estate costs, manufacturing flaws, and component failure risks. For example, a single ERoT failure could cause the return of a full baseboard or system. Also, ERoT chips are typically low cost, yet the risks associated with the ERoT chips put billions of dollars of data center business at risk. Additionally, there is often a heavy integration effort and customization required between ERoT firmware and components whose firmware is being protected, causing further security and manageability risks associated with such customization in addition to associated costs.

Further, the ERoT chip also cannot be used as a platform active root of trust for larger server systems either since the ERoT chip has limited IO and has limited code space and static random access memory (SRAM). The ERoT also has a limited memory protection unit (MPU) used for memory isolation functionality that limits task isolation to between 5-8 regions that require making security compromises in firmware design and limited processing power due to being built on smaller microcontrollers. These microcontrollers also lack advanced memory protection. Each physical ERoT is typically (but not always) associated with a single AP (such as a GPU, CPU, or the like) and up to three or four flash memory devices, including two for firmware, another for staging firmware updates, a potential fourth as a minimum security version. The requirement for the multiplication of ERoT and flash memories adds to bill of materials cost and increased failure rates associated with increased number flash memories.

Aspects and embodiments of the present disclosure address the above deficiencies of using distributed ERoTs and flash memories and other problems by virtualizing ERoTs using a trusted execution environment of a management controller within the distributed computing system, e.g., a network platform or data-center-on-a-chip. In some embodiments, these virtual ERoTs (vERoTs) are Active Component (AC) RoTs (e.g., AC-RoTs). In various embodiments, a Platform Active Root of Trust (or PA-ROT) may also be implemented on an existing management chip such as a baseboard management controller (BMC) that is capable of platform-wide security control management. In this way, each individual ERoT, and a PA-ROT, can be virtualized in a central location of the management controller (or "BMC") that includes a large number of IO controllers and a much larger memory footprint, all while providing the necessary isolation to meet security requirements. The CPUs on-board of such management controllers are of an order of magnitude more powerful than ERoTs and have fully featured memory management controllers (MMUs) and caches to provide finer-grained isolation for better security. Access to IO can be arbitrated, time sliced, and virtualized across vRoTs, as required, thus reducing the amount of required IO and also driving up utilization of distributed computing.

In some embodiments, for example, a system includes a plurality of APs, a plurality of flash memory devices associated with the plurality of APs, and a plurality of multiplexers, each to selectively couple a flash memory device of the plurality of flash memory devices to an AP of the plurality of APs. A controller (such as a management controller or BMC previously discussed) can be operatively coupled to the plurality of multiplexers. The controller can be configured to provide a trusted execution environment (TEE) to execute a virtual root of trust (vRoT) application for each respective AP of the plurality of APs. In embodiments, each vRoT application accesses a corresponding one or more of the plurality of flash memory devices via a corresponding one or more of the plurality of multiplexers. In embodiments, an external processor includes a plurality of interface controllers, one for each of the vRoT applications, through which to interact with the plurality of multiplexers, and includes control logic to control the selection of inputs by the plurality of multiplexers, e.g., so that access to the flash memory devices is multiplexed between the vRoT applications and the associated APs.

In other embodiments, a system includes one or more processor cores (e.g., processing device) to execute an unsecured kernel and a trusted operating system (OS), which provides a trusted execution environment (or TEE). A memory management unit (MMU) can be coupled to the one or more processor cores and input/output (IO) hardware can be coupled to the MMU and to a plurality of flash memory devices associated with a plurality of APs of a distributed computing system. In embodiments, the trusted OS executes an vRoT application for each respective AP of the plurality of APs and employs the MMU to isolate the IO hardware for the trusted OS to securely communicate with the plurality of flash memory devices while being protected from intrusion by an application running on the unsecured kernel.

Therefore, advantages of the systems and methods implemented in accordance with some embodiments of the present disclosure include, but are not limited to, eliminating the need for dozens of ERoT chips and some associated flash memory device with concomitant security risks and costs, which were discussed. The advantages further include mitigation of supply chain risk since the quantity of BMC (or other controller) chips needed is a fraction of the number of ERoTs, and which can provide full control of source code and chip audit. The BMCs may also be located on data center secure control module (DC-SCM) cards, so a failed BMC chip can require only returning the module, not the entire system, for repair. By eliminating an ERoT between a component (AP) and associated flash memory device, associated problems are eliminated around integration caused due to flash monitoring capabilities. Further, communication between the vRoTs and their corresponding APs can be simplified to a few well-defined messages. In some embodiments, because the BMC (or other controller), vRoTs, and the PA-ROT functions can be performed on a single DC-SCM card, the staging flash can be consolidated to a single embedded multi-media card (eMMC) storage on the module, thus reducing failure rates and bill of materials costs due to flash memory devices. Other advantages will be apparent to those skilled in the art of distributed computing systems and platforms, such as in data centers, as will be discussed hereinafter.

Figure 2:
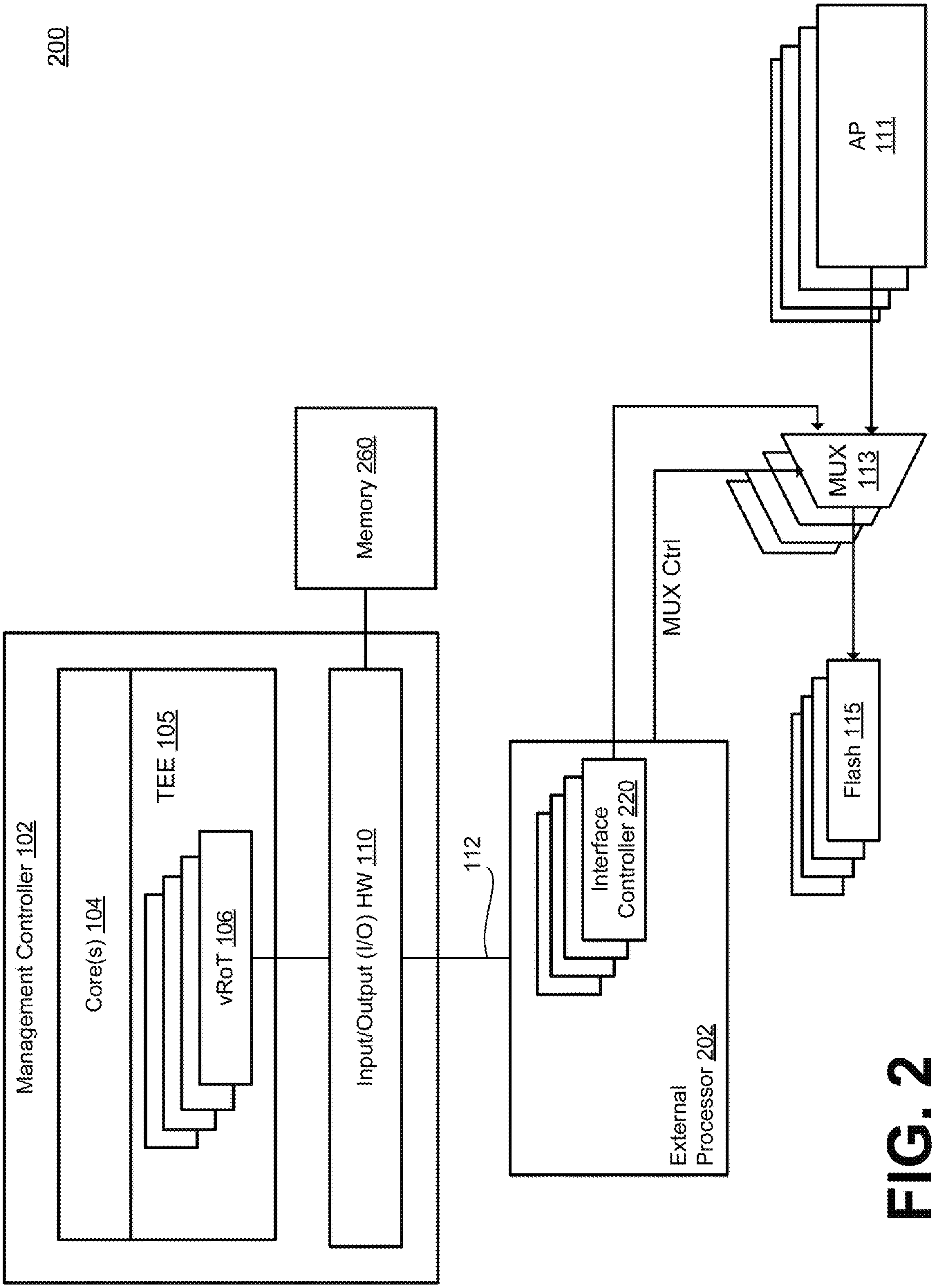
FIG. 2 is a schematic block diagram of an example distributed computing system supporting vRoT applications for multiple APs from a TEE according to additional embodiments.

FIG. 1 is a schematic block diagram of an example distributed computing system 100 supporting virtualized root of trust (vRoT) applications for multiple APs from a trusted execution environment (TEE) according to some embodiments. FIG. 2 is a schematic block diagram of an example distributed computing system 200 supporting vRoT applications for multiple APs from a TEE according to additional embodiments. In embodiments, the system 100 and 200 includes a management controller 102 operatively coupled to a plurality of multiplexers 113, which are coupled to a plurality of APs 111 and a plurality of flash memory devices 115. In some embodiments, the plurality of APs 111 include, but are not limited to, GPUs, CPUs, data processing units (DPUs), and other computing devices, such as high-speed interconnects. In embodiments, the plurality of flash memory devices 115 are associated with (e.g., coupled to) respective ones of the plurality of APs 111. Further, each multiplexer can selectively couple a flash memory device of the plurality of flash memory devices 115 to an AP of the plurality of APs 111. In some embodiments, the management controller 102 is a baseboard management controller (BMC) or controller designed for control, security, and/or management of the system 100 or 200. In embodiments, the BMC is located on a DC-SCM card of the system 100 or 200.

In various embodiments, the management controller 102 includes one or more processor cores 104 (e.g., processing device) configured to provide (e.g., execute) a trusted execution environment or TEE 105. In embodiments, the TEE 105 executes a vRoT application 106 for each respective AP of the plurality of APs 111, although a one-to-one correspondence is not required. In embodiments, each vRoT application 106 accesses a corresponding one or more of the plurality of flash memory devices 115 via a corresponding one or more of the plurality of multiplexers 113. The management controller 102 can further include IO hardware 110 through which each vRoT application 106, running on the TEE 105, can communicate with each respective flash memory device 115. For example, the IO hardware 110 can include an inter-integrated circuit (I2C), improved inter-integrated circuit (I3C), or peripheral component interconnect express (PCIe) circuit, serial peripheral interface (SPI) circuit, or the like.

As illustrated in FIG. 1, according to some embodiments, a first vRoT application 106A can be coupled to a first multiplexer 113A (and/or a second multiplexer 113B), a second vRoT application 106B can be coupled to the second multiplexer 113B, and an nth vRoT application 106N can be coupled to an nth multiplexer 113N. In embodiments, the first multiplexer 113A enables selectively coupling, to a first AP 111A, of the first vRoT application 106A and a first flash memory device 115A. In embodiments, the second multiplexer 113B enables selectively coupling, to a second AP 111A, of the second vRoT application 106B (or the first vRoT application 106A, illustrated by a dashed line) and a second flash memory device 115B. In embodiments, the nth multiplexer 113N enables selectively coupling, to an nth AP 111N, of the nth vRoT application 106N and an nth flash memory device 115N.

In some embodiments, each vRoT application 106 is able to update secure data located in the flash memory device 115 to which the vRoT application 106 is coupled via a corresponding multiplexer. Each vRoT application 106 can also cause, using the secure data, at least one security operation to be performed on behalf of the AP associated with (e.g., coupled to) the flash memory device 115. In some embodiments, the secure data includes firmware (FW) and/or configuration data, e.g., which would enable an AP to securely boot and securely operate. In some embodiments, the security operation is a secure boot of the AP, an attestation of the AP, secure recovery of firmware or configuration data from the AP, installing a debug token or debug firmware on the AP, and/or a secure update to firmware of at least some of the plurality of flash memory devices 115 of corresponding APs 111. In environments that require stringent security compliance, such as in military, government, corporate, or financial sectors, measuring the flash device and documenting the integrity checks may be necessary for audit and compliance purposes. Thus, such updates and integrity checks can provide a verifiable trail that the integrity of the system 100 or 200 is maintained.

In various embodiments, the management controller 102 further performs a security-related update to one or more of the vRoT applications 106. For example, the security-related updates can include distributing a new or updated security policy to the vRoT application(s) 106 that are associated with coupled flash memory device(s) 115. The security-related update can further include enforcing the new or updated security policy associated with a particular APs, which are selectively coupled to respective flash memory devices 115 via one or more of the multiplexers 113.

With additional reference to FIG. 2, the system 200 can include a memory 260 to store code or instructions to be executed by the one or more processor cores 104 as well as system and user data. In some embodiments, the memory 260 includes volatile and/or non-volatile memory, to include computer storage. The memory 260 can also include specialized memory devices such as a flash memory or eMMC storage device for use by the management controller 102.

In some embodiments, the system 200 also includes an processor 202 that includes a plurality of interface controllers 220. In various embodiments, the external processor 202 is a system-on-a-chip (SOC) such as a field-programmable gate array (FPGA), an application-specific integrated circuit (ASIC), a microcontroller, or a complex programable logic device, or the like. In embodiments, the IO hardware 210 and the external processor 202 communicate over a management component transport protocol (MCTP) PCIe interface, e.g., using MCTP and PCIe protocols. Further, the IO hardware 210 can communicate with the memory 260 over any appropriate memory or interface protocol for a memory type.

In embodiments, each multiplexer of the plurality of multiplexers 113 receives, as inputs, an output of one of the plurality of interface controllers 220 and of one of the plurality of APs 111. In embodiments, each multiplexer 113 also receives, as a control input (or selection input), a multiplexer control signal (MUX ctrl.), From the external processor 202, which controls which multiplexer inputs are passed to multiplexer outputs. In embodiments, the plurality of interface controllers 220 and the multiplexer control signal are controllable by respective vRoT applications over the IO hardware. In the systems discussed below with reference to FIGS. 3-5, the IO hardware of any of these systems 300, 400, or 500 can communicate with and through the external processor 202 and/or the plurality of multiplexers 113 for ultimate access to the plurality of flash memory devices 115.

Figure 3:
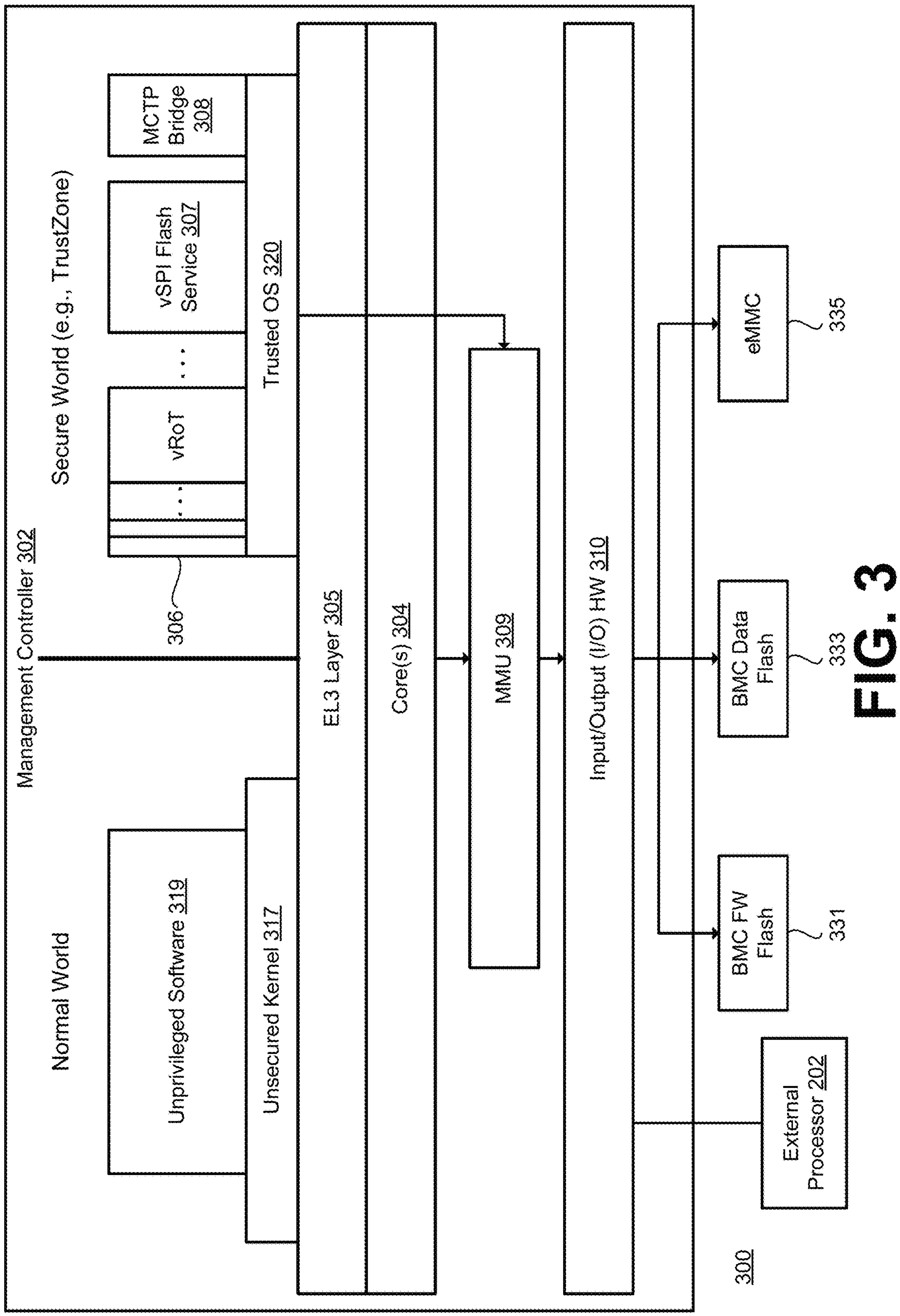
FIG. 3 is a schematic block diagram of an example distributed computing system supporting vRoT applications from a management controller on which both an unsecured kernel and a trusted operating system (OS) are executed according to some embodiments.

FIG. 3 is a schematic block diagram of an example distributed computing system 300 supporting vRoT applications from a management controller on which both an unsecured kernel and a trusted operating system (OS) are executed according to some embodiments. In embodiments, for example, the system 300 includes a management controller 302 coupled to the external processor 202 (or directly to the plurality of multiplexers 113), as well as coupled to a BMC firmware flash device 331, a BMC data flash device 333, and an eMMC storage device 335, which will be discussed in more detail. In some embodiments, the management controller 302 is a BMC or controller designed for control, security, and/or management of the system 300. In embodiments, the BMC is located on a DC-SCM card of the system 300.

In some embodiments, the management controller 302 includes one or more processing cores 304 (e.g., a processing device) for executing an unsecured kernel 317, which provides a normal world and that also executes a trusted OS 320. In embodiments, the trusted OS 320 provides a secure world (such as TrustZone™, a technology developed by ARM®, that creates an isolated secure world within a processor to run trusted applications). The system 300 can provide a secure operational partition between the normal and secure worlds. In some embodiments, for example, the trusted OS 320 is OPTEE, hafnium, or the Linux kernel, so the disclosed embodiments can be executed on existing systems. Where TrustZone™ technology is employed, the one or more cores 304 may also provide an Exception level 3 (or EL3) layer 305, which is the highest privileged level in an exception model of ARM® typically reserved for secure firmware and that supports TrustZone™.

In various embodiments, the unsecured kernel 317 executes unprivileged software 319 while the trusted OS 320 executes privileged software such as a plurality of vRoT applications 306, a virtual SPI flash service 307, which can support serial peripheral interface (SPI)-based flash memory devices with which the vRoT applications 306 are interacting, and a management component transport protocol (MCTP) bridge 308 to provide secure communication across MCTP-based interconnects.

In some embodiments, the management controller 302 includes an MMU 309 coupled to the one or more cores 304 and IO hardware 310 coupled between the MMU 309 and the external devices such as the external processor 202, the BMC firmware flash device 331, the BMC data flash device 333, and the eMMC storage device 335. In some embodiments, the BMC data flash device 333 is a non-volatile memory device coupled to the IO hardware 310 and configured to store flash data for the vRoT applications 106. In some embodiments, the BMC firmware flash device 331 is a non-volatile memory device coupled to the IO hardware 310 and configured to store firmware for the vRoT applications 106.

In various embodiments, the external processor 202 (FIG. 2) is coupled between the IO hardware 310 and the plurality of multiplexers 313. In embodiments, the trusted OS 320 employs the MMU 309 to isolate the IO hardware 310 for the trusted OS 320, e.g., to securely communicate with the plurality of flash memory devices 115 while being protected from intrusion by an application running on the unsecured kernel 317. In this way, the trusted OS 320 can arbitrate secure communication that is separate from the normal world of the unsecured kernel 317 despite operating on the same distributed computing system.

Figure 4:
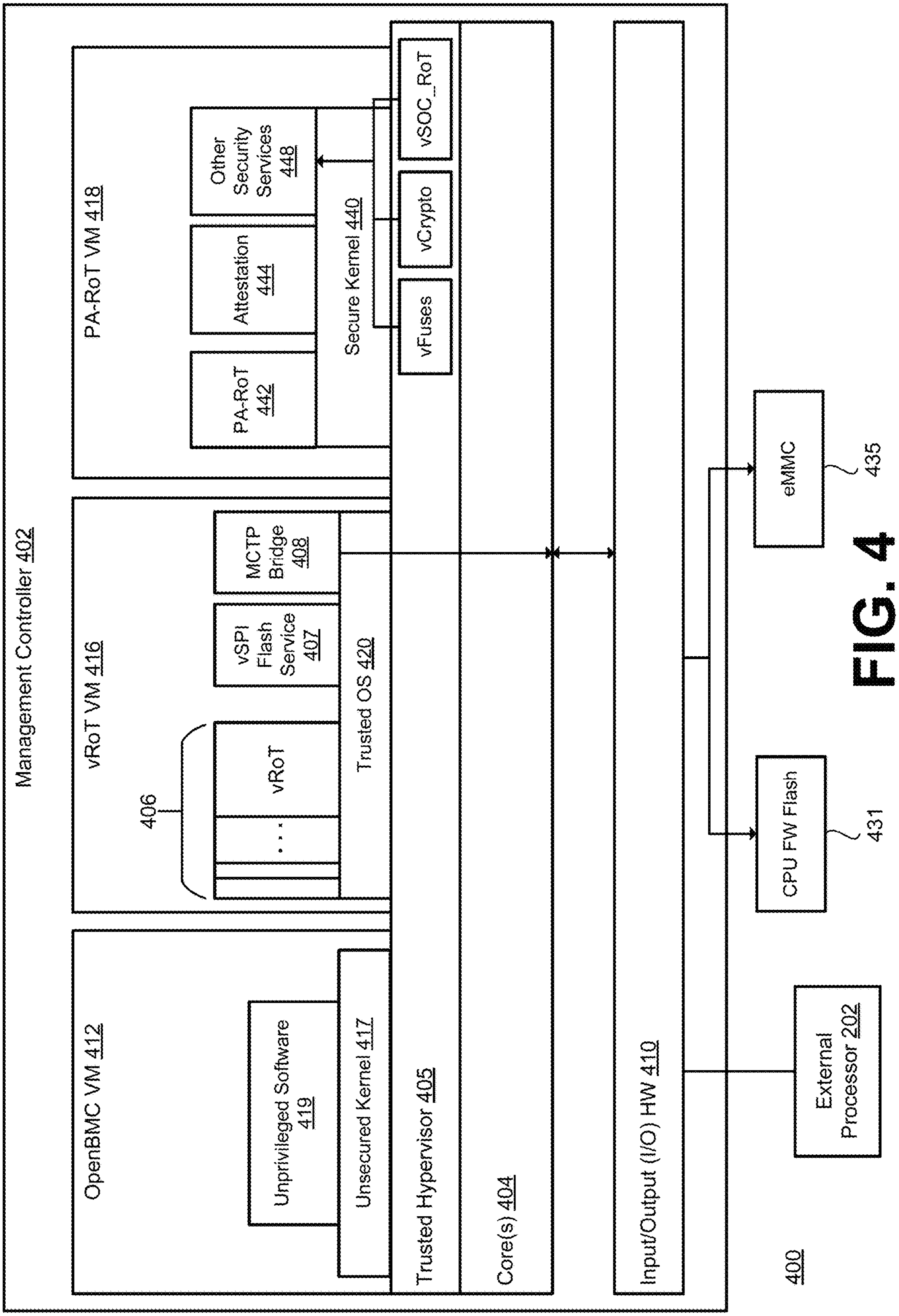
FIG. 4 is a schematic block diagram of an example distributed computing system supporting vRoT applications from a management controller on which an unsecured kernel, a trusted OS, and a secure kernel operate are executed according to some embodiments.

FIG. 4 is a schematic block diagram of an example distributed computing system 400 supporting vRoT applications from a management controller on which an unsecured kernel, a trusted OS, and a secure kernel operate are executed according to some embodiments. In embodiments, for example, the system 400 includes a management controller 402 coupled to the external processor 202 (or directly to the plurality of multiplexers 113), as well as coupled to a BMC firmware flash device 431 and an eMMC storage device 435, which will be discussed in more detail. In some embodiments, the management controller 402 is a BMC or controller designed for control, security, and/or management of the system 400. In embodiments, the BMC is located on a DC-SCM card of the system 400.

In some embodiments, the management controller 402 includes one or more processor cores 404 (e.g., a processing device) on which is executed a trusted hypervisor 405, e.g., Xen, KVM, Hyper-V, or the like. In some embodiments, an unsecured kernel 417, a trusted OS 420, and a secure kernel 440 can operate on the trusted hypervisor. For example, the unsecured kernel 417 can execute an open BMC virtual machine 412 through which to provide unprivileged software. Further, the trusted OS 420 can execute an vRoT virtual machine 416 to run each of a plurality of vRoT applications 406, a virtual SPI flash service 407, which can support SPI-based flash memory devices with which the vRoT applications 406 are interacting, and an MCTP bridge 408 to provide secure communication across MCTP-based interconnects.

In embodiments, the vRoT virtual machine 416 performs end-to-end encryption between the trusted OS 420 and each respective flash memory device of the plurality of flash memory devices 115. In some embodiments, the trusted OS 320 of 420 performs a security-related update to one or more of the vRoT applications 406, such as distributing a new or updated security policy to the vRoT application(s) 406 or enforcing the new or updated security policy associated with a corresponding AP 111.

In embodiments, the secure kernel 440 can execute a PA-ROT virtual machine 418 to run a PA-ROT application 442, an attestation application 444, and one or more additional platform security services 448. In embodiments, the PA-ROT 442 ensures that the system 400 operates securely by establishing and managing a root of trust through hardware and firmware.

In various embodiments, the management controller 402 also includes IO hardware 410 coupled to the processing device (e.g., one or more processor cores 404) and to the external devices, e.g., the external processor 202 (or directly to the plurality of multiplexers 113), the BMC firmware flash device 431, and the eMMC storage device 435. In embodiments, the management controller bridge (e.g., the MCTP bridge 408) provides secure communication between the trusted hypervisor 405 and the IO hardware 410.

In some of the disclosed embodiments, the trusted hypervisor 405 also directly executes virtual fuses (vFuses), virtual cryptography (vCrypto), and/or a virtual system-on-a-chip (SOC) ROT (vSOC_RoT), in support of the PA-ROT virtual machine 418 running on the secure kernel 440. Fuses in the context of the PA-ROT virtual machine 418 can refer to physical, one-time programmable (OTP) memory cells used to store critical data that are protected from modification, thus the term “virtual” so that these memory cells may be logical and backed by secured cache, for example. These are called fuses because once they are set (programmed), they cannot be changed; they are “blown” like an electrical fuse. Fuses can store cryptographic keys, device identity and authentication, and configuration settings. Cryptography with reference to the secure kernel 440 encompasses the algorithms and cryptographic processes used to protect data and ensure secure communication for the PA-ROT virtual machine 442. Thus, fuses and cryptographic mechanisms can work together to provide a robust security foundation. In embodiments, the vSOC_RoT may be or include Caliptra™, which defines a design standard for a silicon internal RoT baseline. This standard satisfies a root of trust for measurement (RTM) role. The open-source implementation of Caliptra™ drives transparency into the RTM and measurement mechanism that anchor hardware attestation.

Figure 5:
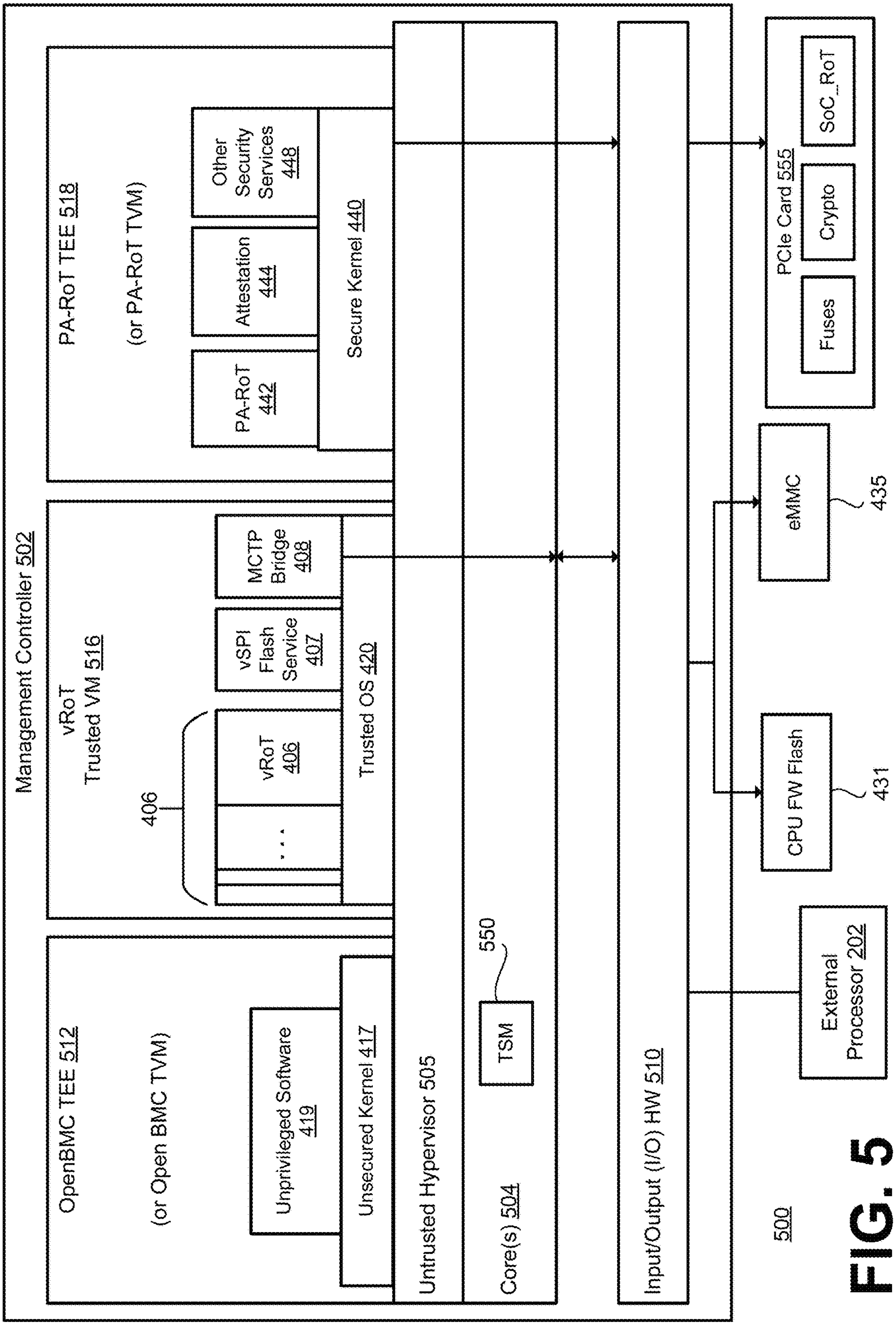
FIG. 5 is a schematic block diagram of an example distributed computing system that varies in TEE availability from that of FIG. 4 according to various embodiments.

FIG. 5 is a schematic block diagram of an example distributed computing system 500 that varies in TEE availability from that of FIG. 4 according to various embodiments. In embodiments, for example, the system 500 includes a management controller 502 coupled to the external processor 202 (or directly to the plurality of multiplexers 113), as well as coupled to the BMC firmware flash device 431 and the eMMC storage device 435. In some embodiments, the management controller 502 is a BMC or controller designed for control, security, and/or management of the system 500. In embodiments, the BMC is located on a DC-SCM card of the system 500.

In some embodiments, the management controller 502 includes one or more processor cores 504 (e.g., processing device) on which is executed an untrusted hypervisor 505. Thus, whatever executes on top of the untrusted hypervisor 505 can provide its own root of trust and/or trusted execution environment (TEE) because the hypervisor 505 is untrusted. In some embodiments, therefore, the unsecured kernel 417 executes an open BMC TEE 512 (or trusted VM) on which to run unprivileged software. Further, the trusted OS 420 can execute a vRoT trusted VM 516 on which to run the vRoT applications 406, the virtual SPI flash service 407, which can support SPI-based flash memory devices with which the vRoT applications 406 are interacting, and the MCTP bridge 408 to help with secure communication across MCTP-based interconnects. Thus, the vRoT applications 406 can be understood to be instantiated as one or more trusted virtual machines. Further, the secure kernel 440 can execute a PA-RoT TEE 518 (or PA-RoT trusted VM) on which to run the PA-RoT application 442, the attestation application 444, and the one or more additional security services 448.

In embodiments, the open BMC TEE 512, the vRoT trusted VM 516, and the PA-RoT TEE 518 can communicate with each other through the untrusted hypervisor 505 using encrypted TEE inter-process communication (IPC). In embodiments, the one or more core(s) 504 can include trusted service manager (TSM) hardware 550 to provide a sufficient level of security with reference to communication passing from the TEE/trusted VMs through IO hardware 510 to external devices. For example, the TSM hardware 550 of the trusted execution environment can enable confidential computing, using a device security interface protocol, between the plurality of APs 111 and the trusted virtual machine (e.g., the vRoT trusted VM 516). In embodiments, the TSM hardware 550 executes firmware adapted to configure the processing device to run each trusted virtual machine.

More specifically, in some embodiments, the management controller 502 also includes the IO hardware 510 coupled to the processing device (e.g., one or more processor cores 504) and to the external devices, e.g., the external processor 202 (or directly to the plurality of multiplexers 113), the BMC firmware flash device 431, and the eMMC storage device 435. In embodiments, the management controller bridge (e.g., the MCTP bridge 408) provides secure communication between the untrusted hypervisor 505 and the IO hardware 510.

In embodiments, the PA-RoT TEE 518 (or PA-RoT trusted VM) uses a TEE device interface security protocol (TDISP)-enabled PCIe card 555 for the aforementioned fuses, crypto, and/or SOC_RoT, and can be protected by end-to-end communication with the plurality of flash memory devices 115 with the TDISP. With additional reference to FIG. 2, the external processor 202 can be assigned to the vRoT trusted VM 516, but be untrusted. In embodiments, the vRoT trusted VM 516 provides end-to-end encryption with the plurality of flash memory devices 115. Alternatively, if the external processor 202 is TDISP-enabled, the external processor 202 can be trusted and end-to-end encryption takes place between each vRoT 406 and the external processor 202.

Figure 6:
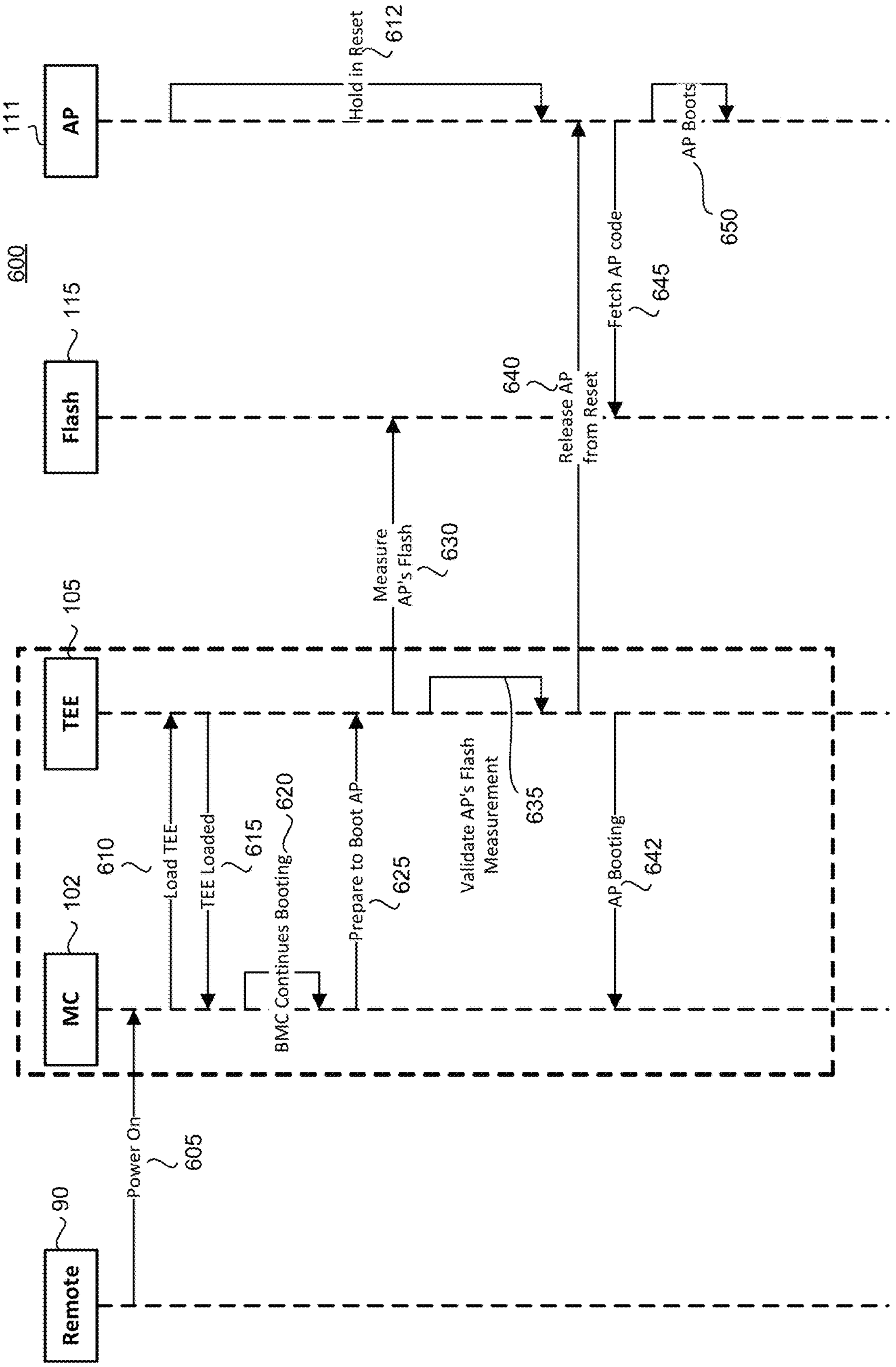
FIG. 6 is a flow diagram of an example method for performing a secure boot of an AP using the management controller(s) according to some embodiments.

FIG. 6 is a flow diagram of an example method 600 for performing a secure boot of an AP using management controller(s) according to some embodiments. The method 600 can be performed by processing logic comprising hardware, software, firmware, or any combination thereof. For example, the method 600 can be performed by the system 100, 200, 300, 400, and/or 500 or by particular components of each system, e.g., by management controller(s) 102, 302, 402, and/or 502 of FIG. 1, FIG. 3, FIG. 4, and FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 605, the processing logic receives a power-on signal (e.g., from a remote device 90) to power on the system and corresponding memory controller.

At operation 610, the processing logic requests a TEE to be loaded into the memory controller. In some embodiments, the processing logic (e.g., of the management controller) and the TEE operate within the same silicon-based chip or component, thus the dashed box.

At operation 612, an AP can be held in reset awaiting to be booted by the processing logic. In embodiments, AP behavior is a policy choice. In some embodiments, the AP may be allowed to boot without delay. In other embodiments, the policy may be configurable per AP.

At operation 615, the processing logic loads the TEE into the memory controller for execution.

At operation 620, the processing logic causes the memory controller to continue booting.

At operation 625, the processing logic causes the TEE to prepare to boot an AP, and thus, it can be understood that a vRoT application of the TEE will now be involved (from the TEE perspective) with validating and securely booting the AP in connection with the flash memory device, as was discussed previously.

At operation 630, the processing logic causes the TEE to measure a flash memory device of the AP.

At operation 635, the processing logic validates the measurement of the flash memory device of the AP. In embodiments, the measurement process involves calculating a cryptographic hash of the firmware or software stored on the flash device. This hash value can then be compared to a previously known good hash value, which represents the trusted state of the firmware. If the calculated hash value matches the trusted hash value, this indicates that the firmware has not been altered or tampered with since it was last verified. The outcome of the measurement process can influence the boot process. For instance, if a mismatch is detected between the measured hash value and the trusted hash value, the system can halt the boot process, enter a recovery mode, or take other predefined security actions. This enforces a strict security policy that aims to safeguard the system from running potentially harmful software.

At operation 640, assuming successful validation of the AP's measurement at operation 635, the processing logic causes the TEE to release the AP from reset, and, at operation 642, receives an indication that the AP is booting.

At operation 645, the flash memory device retrieves the AP code.

At operation 650, the AP completes the secure boot and is now fully operational.

Figure 7:
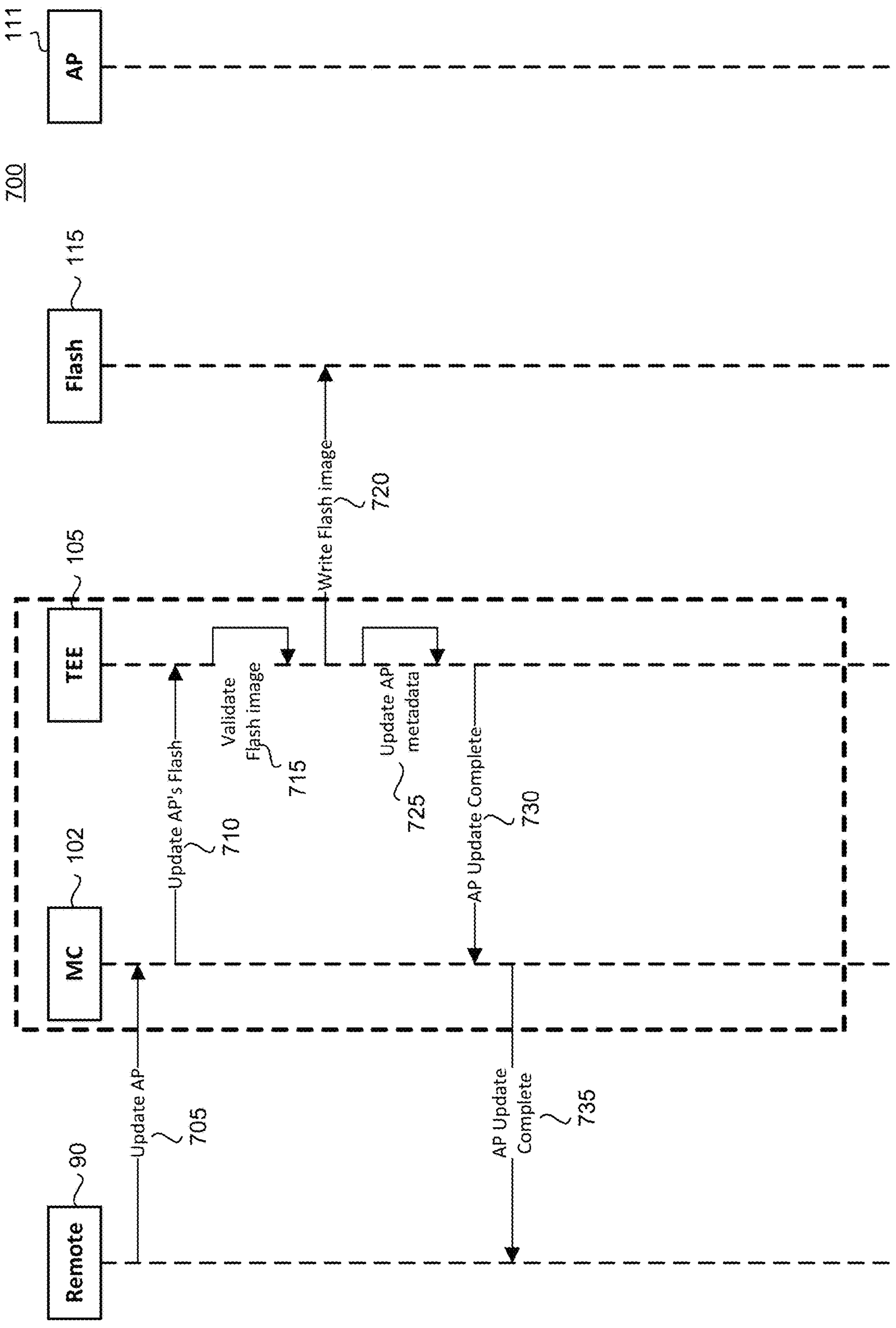
FIG. 7 is a flow diagram of an example method for performing a secure update of an AP via a coupled flash memory device according to some embodiments.

FIG. 7 is a flow diagram of an example method 700 for performing a secure update of an AP via a coupled flash memory device according to some embodiments. The method 700 can be performed by processing logic comprising hardware, software, firmware, or any combination thereof. For example, the method 700 can be performed by the system 100, 200, 300, 400, and/or 500 or by particular components of each system, e.g., by management controller(s) 102, 302, 402, and/or 502 of FIG. 1, FIG. 3, FIG. 4, and FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 705, the processing logic receives a power-on signal (e.g., from the remote device 90) to power on the system and corresponding memory controller.

At operation 710, the processing logic causes the TEE to update a flash memory device of an AP. In some embodiments, the processing logic (e.g., of the management controller) and the TEE operate within the same silicon-based chip or component, thus the dashed box. In embodiments, a vRoT application executing within the TEE performs the secure update to the AP, e.g., via writing to the flash memory device associated with the AP. In some embodiments, the AP behavior is a policy choice. In embodiments, the AP can be running while its access to the flash memory device is temporarily denied. In other embodiments, the AP is held in reset or quiesced into a low or no power state, e.g., while the flash memory device is updated.

At operation 715, the processing logic causes the TEE to validate a flash image of the flash memory device. This validation ensures that the flash image—the binary data to be written to the flash memory—is authentic, unaltered, and safe to install. This image validation can involve several steps that overlap with secure firmware update procedures, focusing specifically on ensuring the integrity and authenticity of the flash image.

At operation 720, the processing logic causes the TEE to write a flash image to the flash memory device assuming that the TEE successfully validated the flash memory device in operation 715.

At operation 725, the processing logic updates AP metadata associated with the programmed flash image at the flash memory device.

At operation 730, the processing logic receives an AP update complete message indicating that the flash image write at the flash memory device successfully completed.

At operation 735, the processing logic sends an AP update complete message to the remote device 90.

Figure 8:
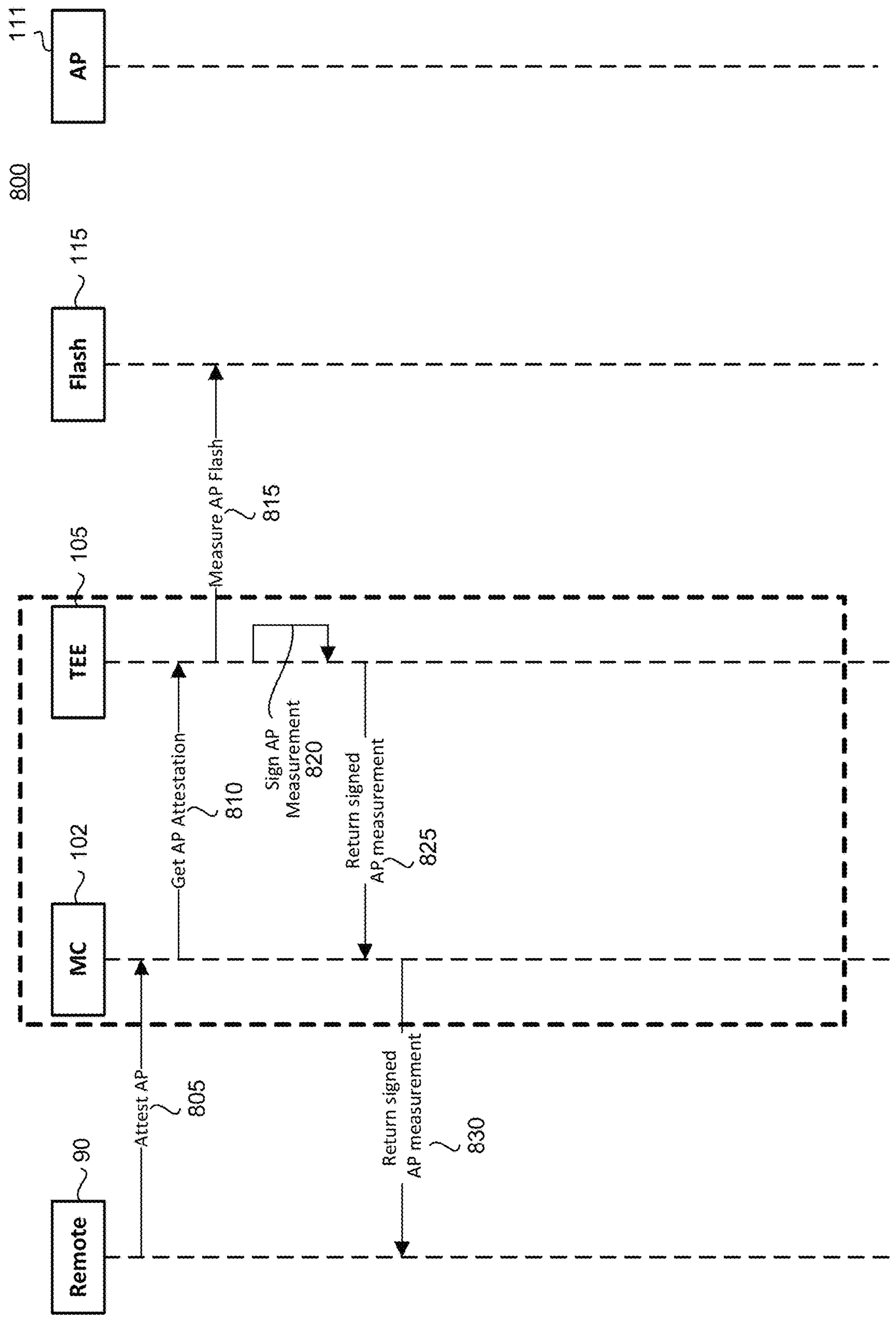
FIG. 8 is a flow diagram of an example method for performing a secure attestation of an AP according to some embodiments.

FIG. 8 is a flow diagram of an example method for performing a secure attestation of an AP according to some embodiments. The method 800 can be performed by processing logic comprising hardware, software, firmware, or any combination thereof. For example, the method 800 can be performed by the system 100, 200, 300, 400, and/or 500 or by particular components of each system, e.g., by management controller(s) 102, 302, 402, and/or 502 of FIG. 1, FIG. 3, FIG. 4, and FIG. 5. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 805, the processing logic receives an AP attestation command, from the remote device 90, to attest to the integrity of the firmware installed in the flash memory device.

At operation 810, the processing logic requests the TEE to perform AP attestation of the flash memory device. In some embodiments, the processing logic (e.g., of the management controller) and the TEE operate within the same silicon-based chip or component, thus the dashed box. In embodiments, a vRoT application executing within the TEE performs the attestation of the AP, e.g., of the firmware stored in the flash memory device. In some embodiments, the AP behavior is a policy choice. In embodiments, the AP can be running while its access to the flash memory device is temporarily denied. In other embodiments, the AP is held in reset or quiesced into a low or no power state, e.g., while the flash memory device is updated.

At operation 815, the processing logic causes the TEE to measure a flash memory device of the AP. In embodiments, the measurement process involves reading the data in the flash memory and calculating a cryptographic hash of the firmware or software stored on the flash device. This hash value can then be compared to a previously known good hash value, which represents the trusted state of the firmware.

At operation 820, the processing logic causes the TEE to sign the measurement of the flash memory device of the AP. In embodiments, the signing process involves encrypting the measurement using a private cryptographic key, e.g., specific to the vendor of the system that includes the management controller. The corresponding public key should already be trusted and securely stored at the remote device 90.

At operation 825, the processing logic receives, from the TEE, the signed AP measurement.

At operation 830, the processing logic transmits the signed AP measurement received from the TEE to the remote device 90. The remote device 90 can then verify or "attest" that this hash value is valid by using the public key, generated from the public key, to decrypt the signed AP measurement, generating the plaintext of the AP measurement (e.g., hash value) of the flash memory device. The remote device 90 can then compare this calculated hash value to a previously known good hash value, which represents the trusted state of the firmware. If the calculated hash value matches the trusted hash value, this indicates that the firmware has not been altered or tampered with since it was last verified.

Figure 9:
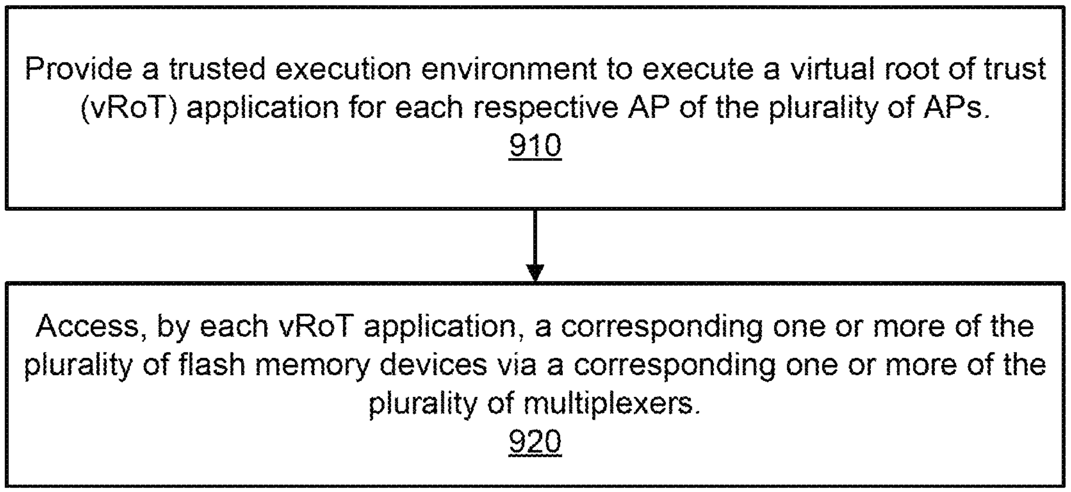
FIG. 9 is a flow chart of a method for operating a distributed computing system having a disclosed management controller according to at least one embodiment.

FIG. 9 is a flow chart of a method 900 for operating a distributed computing system having a disclosed management controller according to at least one embodiment. The method 900 can be performed by processing logic comprising hardware, software, firmware, or any combination thereof. For example, the method 900 can be performed by the system 100 or by particular components of the system 100 (see FIG. 1), e.g., a system including a plurality of APs, a plurality of flash memory devices, a plurality of multiplexers, each to selectively couple a flash memory device of the plurality of flash memory devices to an AP of the plurality of APs, and a controller coupled to the plurality of multiplexers. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 910, the processing logic (e.g., of the controller) provides a trusted execution environment to execute a virtual root of trust (vRoT) application for each respective AP of the plurality of APs.

At operation 920, processing logic accesses, by each vRoT application, a corresponding one or more of the plurality of flash memory devices via a corresponding one or more of the plurality of multiplexers.

In extensions of the method 900, the processing logic further performs a security-related update to a first vRoT application including, e.g., distributing a new or updated security policy to the first vRoT application associated with a first flash memory device, and/or enforcing the new or updated security policy associated with a first AP, which is selectively coupled to the first flash memory device via a first multiplexer of the plurality of multiplexers. The method 900 may also include instantiating the vRoT applications as one or more trusted virtual machines.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code, while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to actions and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or parallel, continuously, or intermittently. In at least one embodiment, the terms "system" and "method" are used herein interchangeably insofar as the system may embody one or more methods, and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways, such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface, or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that the subject matter claimed in appended claims is not necessarily limited to specific features or acts described. Rather, specific features and acts are disclosed as exemplary forms of implementing the claims.

What is claimed is:

1. A system comprising:

a plurality of application processors (APs);

a plurality of flash memory devices associated with the plurality of APs;

a plurality of multiplexers, each to selectively couple a flash memory device of the plurality of flash memory devices to an AP of the plurality of APs; and a controller operatively coupled to the plurality of multiplexers, wherein the controller is to provide a trusted execution environment to execute a virtual root of trust (vRoT) application, of a plurality of vRoT applications, for each respective AP of the plurality of APs, wherein each vRoT application is to access a corresponding one or more of the plurality of flash memory devices via a corresponding one or more of the plurality of multiplexers.

2. The system of claim 1, wherein a first multiplexer of the plurality of multiplexers is to selectively couple, to a first flash memory device of the plurality of flash memory devices, one of a first AP of the plurality of APs or the controller executing a first vRoT application, wherein the first flash memory device stores secure data, and wherein the first vRoT application is to at least one of:

update the secure data located in the first flash memory device; or cause, using the secure data, at least one security operation to be performed on behalf of the first AP.

3. The system of claim 2, wherein the secure data comprises at least one of firmware or configuration data, and wherein the security operation is one of a secure boot of the first AP, an attestation of the first AP, secure recovery of firmware or configuration data from the first AP, installing a debug token or debug firmware on the first AP, or a secure update to firmware of at least some of the plurality of flash memory devices.

4. The system of claim 1, wherein the controller is further to perform a security-related update to a first vRoT application, the security-related update comprising a new or updated security policy and at least one of:

distribute the new or updated security policy to the first vRoT application that is associated with a first flash memory device; or enforce the new or updated security policy associated with a first AP, which is selectively coupled to the first flash memory device via a first multiplexer of the plurality of multiplexers.

5. The system of claim 1, wherein the controller comprises a baseboard management controller and wherein the vRoT applications are instantiated as one or more trusted virtual machines.

6. The system of claim 1, wherein the trusted execution environment comprises a trusted operating system (OS) running on a processing device that also executes an unsecured kernel, the system further comprising:

a memory management unit (MMU); and input/output (IO) hardware coupled to the MMU; and an external processor that is coupled between the IO hardware and the plurality of multiplexers, wherein the trusted OS is to employ the MMU to isolate the IO hardware for the trusted OS to securely communicate with the plurality of flash memory devices while being protected from intrusion by an application running on the unsecured kernel.

7. The system of claim 6, further comprising a non-volatile memory device coupled to the IO hardware and to store flash data for the vRoT applications.

8. The system of claim 6, wherein the external processor comprises a plurality of interface controllers, wherein each multiplexer of the plurality of multiplexers is to receive, as inputs, an output of one of the plurality of interface controllers and of one of the plurality of APs, and to receive, as a control input, a multiplexer control signal from the external processor, and wherein the plurality of interface controllers and the multiplexer control signal are controllable by respective vRoT applications over the IO hardware.

9. The system of claim 1, further comprising:

a processing device, of the controller, to execute a trusted hypervisor on which are executed:

a trusted operating system executing a vRoT virtual machine to run each of the vRoT applications and a management controller bridge; and a secure kernel running a platform active RoT (PA-RoT) virtual machine and one or more additional platform security services;

input/output (IO) hardware coupled to the processing device, wherein the management controller bridge is to provide secure communication between the trusted hypervisor and the IO hardware; and an external processor that is coupled between the IO hardware and the plurality of multiplexers.

10. The system of claim 9, wherein the vRoT virtual machine is a trusted virtual machine, wherein the processing device comprises trusted service manager (TSM) hardware of the trusted execution environment to enable confidential computing, using a device security interface protocol, between the plurality of APs and the trusted virtual machine, wherein the TSM hardware executes firmware adapted to configure the processing device to run the trusted virtual machine.

11. The system of claim 9, wherein the vRoT virtual machine is to perform end-to-end encryption between the trusted operating system and each respective flash memory device of the plurality of flash memory devices.

12. A method of operating a distributed computing system comprising a plurality of application processors (APs), a plurality of flash memory devices, a plurality of multiplexers, each to selectively couple a flash memory device of the plurality of flash memory devices to an AP of the plurality of APs, and a controller coupled to the plurality of multiplexers, wherein the method comprises:

providing, by the controller, a trusted execution environment to execute a virtual root of trust (vRoT) application, of a plurality of vRoT applications, for each respective AP of the plurality of APs; and accessing, by each vRoT application, a corresponding one or more of the plurality of flash memory devices via a corresponding one or more of the plurality of multiplexers.

13. The method of claim 12, further comprising:

selectively coupling, by a first multiplexer of the plurality of multiplexers, to a first flash memory device of the plurality of flash memory devices, one of a first AP of the plurality of APs or the controller executing a first vRoT application;

updating, by the first vRoT application, secure data located in the first flash memory device; and causing, by the first vRoT application, using the secure data, at least one security operation to be performed on behalf of the first AP.

14. The method of claim 13, wherein the secure data comprises at least one of firmware or configuratioin data, and wherein the security operation is one of a secure boot of the first AP, an attestation of the first AP, secure recovery of firmware or configuration data from the first AP, installing a debug token or debug firmware on the first AP, or a secure update to firmware of at least some of the plurality of flash memory devices.

15. The method of claim 12, further comprising performing, by the controller, a security-related update to a first vRoT application, the security-related update comprising a new or updated security policy and at least one of:

distributing the new or updated security policy to the first vRoT application associated with a first flash memory device; or enforcing the new or updated security policy associated with a first AP, which is selectively coupled to the first flash memory device via a first multiplexer of the plurality of multiplexers.

16. The method of claim 12, further comprising instantiating the vRoT applications as one or more trusted virtual machines.

* * * * *